(12) United States Patent
Stelly, III (10) Patent No.: US 7,129,951 B2
(45) Date of Patent: Oct. 31, 2006

(54) METHOD AND SYSTEM FOR PERFORMING SPECULATIVE COLLISIONS FOR A VIDEO GAME

(75) Inventor: John B. Stelly, III, Bothell, WA (US)

(73) Assignee: Valve Corporation, Bellevue, WA (US)

( * ) Notice: Subject to any disclaimer, the term of this patent is extended or adjusted under 35 U.S.C. 154(b) by 258 days.

(21) Appl. No.: 10/840,755

(22) Filed: May 6, 2004

(65) Prior Publication Data

US 2005/0248570 A1 Nov. 10, 2005

(51) Int. Cl.
*G06T 13/00* (2006.01)
*G06F 17/50* (2006.01)
*G06G 7/48* (2006.01)

(52) U.S. Cl. .............. 345/474; 703/2; 703/7
(58) Field of Classification Search .......... 345/474, 345/441; 701/31; 703/8, 6, 7, 2
See application file for complete search history.

(56) References Cited

U.S. PATENT DOCUMENTS

| | | | |
|---|---|---|---|
| 4,785,399 A | 11/1988 | Evans et al. | |
| 5,047,916 A | 9/1991 | Kondo | |
| 5,835,684 A | 11/1998 | Bourne et al. | |
| 5,889,926 A | 3/1999 | Bourne et al. | |
| 6,099,573 A * | 8/2000 | Xavier | 703/7 |
| 6,493,607 B1 | 12/2002 | Bourne et al. | |

OTHER PUBLICATIONS

Kevin Vlack and Susumu Tachi, "Fast and Accurate Spacio-Temporal Intersection Detection with the GJK Algorithm," Dec. 5, 2001, Proceedings of the 11th International Conference on Artificial Reality and Tele-Existence (ICAT2001), p. 79-84.*

E. Gilbert et al., "A Fast Procedure for Computing the Distance Between Complex Objects in Three-Dimensional Space", IEEE, 1998, pp. 193-203.

S. Cameron, "Enhancing GJK: Computing Minimum and Penetration Distances Between Convex Polyhedra", IEEE, 1997, pp. 1-6.

E.G. Gilbert et al., "A New Algorithm for Detecting the Collision of Moving Objects", IEEE, 1989 pp. 8-14.

(Continued)

*Primary Examiner*—Ulka Chauhan
*Assistant Examiner*—Jason M. Repko
(74) *Attorney, Agent, or Firm*—Darby & Darby, P.C.; Jamie L. Wiegand (57) ABSTRACT

A system and method directed to speculating a collision in a video game. A vectorial sum of vertices of a first object, a second object, and motion vector for the first object is used to determine if a collision occurs. A shifted motion vector beginning at an origin within the vectorial sum, with substantially same orientation as the motion vector is employed to determine an intersection on a collision plane. A first triangle is constructed containing the origin and having vertices among vertices of the vectorial sum. Subsequent triangles sharing one edge with a previous triangle are constructed without overlapping. The iterative construction process is terminated when no vertex of the vectorial sum remains to be selected for a new triangle. A time and location of the collision is determined based on coordinates of the triangle vertices establishing a length of a line segment between the origin and the intersection.

25 Claims, 6 Drawing Sheets

OTHER PUBLICATIONS

Game Development Algorithms, "Physics for High Belocity Entities", Game Development Algorithms Web Site, www.gdalgorithms.org/archives/2003-10/778c33fa3f9a2a96.html.

K. Henriksen, "Collision Detection the GJK Algorithm", Presentation from the Department of Computer Science at the University of Copenhagen, pp. 1-44.

G. Van Den Bergen, "A Fast and Robust GJK Implementation for Collision Detection of Convex Objects", Department of Mathematics and Computing Science Eindhoven University of Technology, Jul. 6, 1999, pp. 1-20.

* cited by examiner

METHOD AND SYSTEM FOR PERFORMING SPECULATIVE COLLISIONS FOR A VIDEO GAME

FIELD OF THE INVENTION

The present invention relates generally to computer graphics, and more particularly, to performing speculative collision calculations simulating realistic interactions between three dimensional objects.

BACKGROUND OF THE INVENTION

It has long been the goal of computer arts to create realistic images through computer graphics. Fast 3D processing provided by modern video game consoles and computer processors may be used to generate realistic animation at a high speed in interactive response to a player's manipulation of inputs devices such as a handheld controller. Such advanced video graphics systems provide nearly cinematic quality and realism while allowing all kinds of real and imaginary scenes and characters to be displayed with interactive animation.

One of the challenges to providing realistic, interactive, high-speed 3D computer animation relates to the manner in which the computer animates movement of an object. Many computer graphics animation systems define the object in terms of what the object looks like, such as shape or form. Furthermore, animated objects move, and therefore have dynamic characteristics as well. For example, to realistically animate a ball, it is necessary to model the elasticity of the ball (i.e. how much it deforms when it strikes another object). Another characteristic commonly modeled is how the object behaves when it collides with another object (i.e. does it bounce, deform, shatter).

Any representation in computer graphics whether realistic or imaginary requires a certain amount of dynamic realism in order to be properly evaluated by the human brain. In addition to the above mentioned modeling approaches, a critical part of realistic animation is the ability of the graphics program to predict the location and speed of collision, such that the behavior of the object before and after the collision may be determined. Thus, it is with respect to these considerations, and others, that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

The present invention is directed to addressing the above-mentioned shortcomings, disadvantages and problems, and will be understood by reading and studying the following specification.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment or an embodiment combining software and hardware aspects. The following detailed description is, therefore, not to be taken in a limiting sense.

Briefly stated, the present invention is directed towards a method and system performing computations of determining when and where a speculative collision might occur.

In order to provide realistic animation to video game players, rigid body dynamics may be incorporated into simulation. This way the game engine may be able to speculate what might happen when objects are in the way, and avoid them during movement, or otherwise act appropriately. A position and orientation of an object are assumed in commonly used video game algorithms. However, the present invention speculates when and where a collision might occur without assuming the position and orientation of objects.

Anytime a player makes a decision involving a movement of a character, a motion plan may be generated determining movement of objects, including the character, in the video game. Speculative collision computation helps formulate the motion plan. For example, if the player decides to move the character through a room with furniture in the way, the game engine may determine, whether the character should go around the furniture, jump over it, and the like.

The approach for determining speculative collisions evolves from Gilbert-Johnson-Keerthi (GJK) algorithm. The GJK algorithm is an iterative method for computing a distance between convex objects in order to determine whether the objects will collide. A convex object has a surface that curves outward. While the GJK algorithm merely determines whether objects will collide, the claimed invention speculates when and where a collision might occur. To understand the claimed invention, however, an overview of the GJK algorithm is provided herein.

As mentioned above, the GJK algorithm computes a minimum distance between two convex objects A and B:

$$d(A,B) = \min\{\|x-y\| : x \in A, y \in B\}.$$

The GJK algorithm employs a modified version of a Minkowski sum to determine distances between objects A and B. The Minkowski sum defines a sum of two independent sets (or objects) in vector space, as $$A+B=\{x+y | x \in A, y \in B\}.$$

A property of the Minkowski sum is that A+B is a convex object, if A and B are separately convex objects. As can be seen in the first definition, the GJK algorithm employs a difference of the two objects as opposed to a simple addition of a standard Minkowski sum. Thus, a distance between objects A and B in terms of the modified Minkowski sum can be expressed as $$d(A,B)=\|v(A-B)\|,$$

where v(A–B) defines a point in A–B closest to an origin O:

$$\|v(A-B)\|=\min \{\|x\|: x \in A-B\}.$$

The GJK algorithm is basically an iterative method for approximating v(A–B) for convex objects A and B. In each iteration a simplex is constructed within A–B that is closer to the origin O than the simplex constructed in the previous iteration. A simplex is a Euclidean geometric spatial element having a minimum number of boundary points, such as a ray in one-dimensional space, a triangle in two-dimensional space, a tetrahedron in three-dimensional space, and the like. The result of the iterations is a minimum distance $v_{min}$ that determines whether objects A and B collide or not. A more detailed description of an exemplary iterative process is described in conjunction with FIGS. 4B–4E.

As described above, the GJK algorithm determines whether objects A and B collide or not. However, to provide realistic animations, video game applications need to determine additionally when and where the collision might occur especially in a situation where at least one of the two objects is in linear motion. To perform this speculation, the present invention employs a construction of subsequent simplices along a ray between the origin and an intersection point of the ray and vectorial sum representing a space of distances between objects A and B. At the conclusion of the GJK algorithm, a first simplex consisting of vertices on the Minkowski sum that contains the origin is obtained. Subsequent simplices are constructed by intersecting the ray with the first simplex. This reduces the first simplex to a subsequent simplex that the ray intersects. The ray may intersect an edge of a triangle in two-dimensional space, a triangle on a tetrahedron in three-dimensional space, and the like. Next, using a support map operator, the subsequent simplex is expanded to a support point in a direction normal to the first simplex, but away from the origin. If no new support point is available, the algorithm has reached the surface of the Minkowski sum and a desired distance may be computed directly. Otherwise the algorithm iterates by reducing and expanding the simplices as described above. By doing so, an intersection point, or collision point, may be reached after a finite number of simplices. The simplices enable a computation of a time and location of the collision without having to calculate the whole Minkowski sum.

Figure 1:
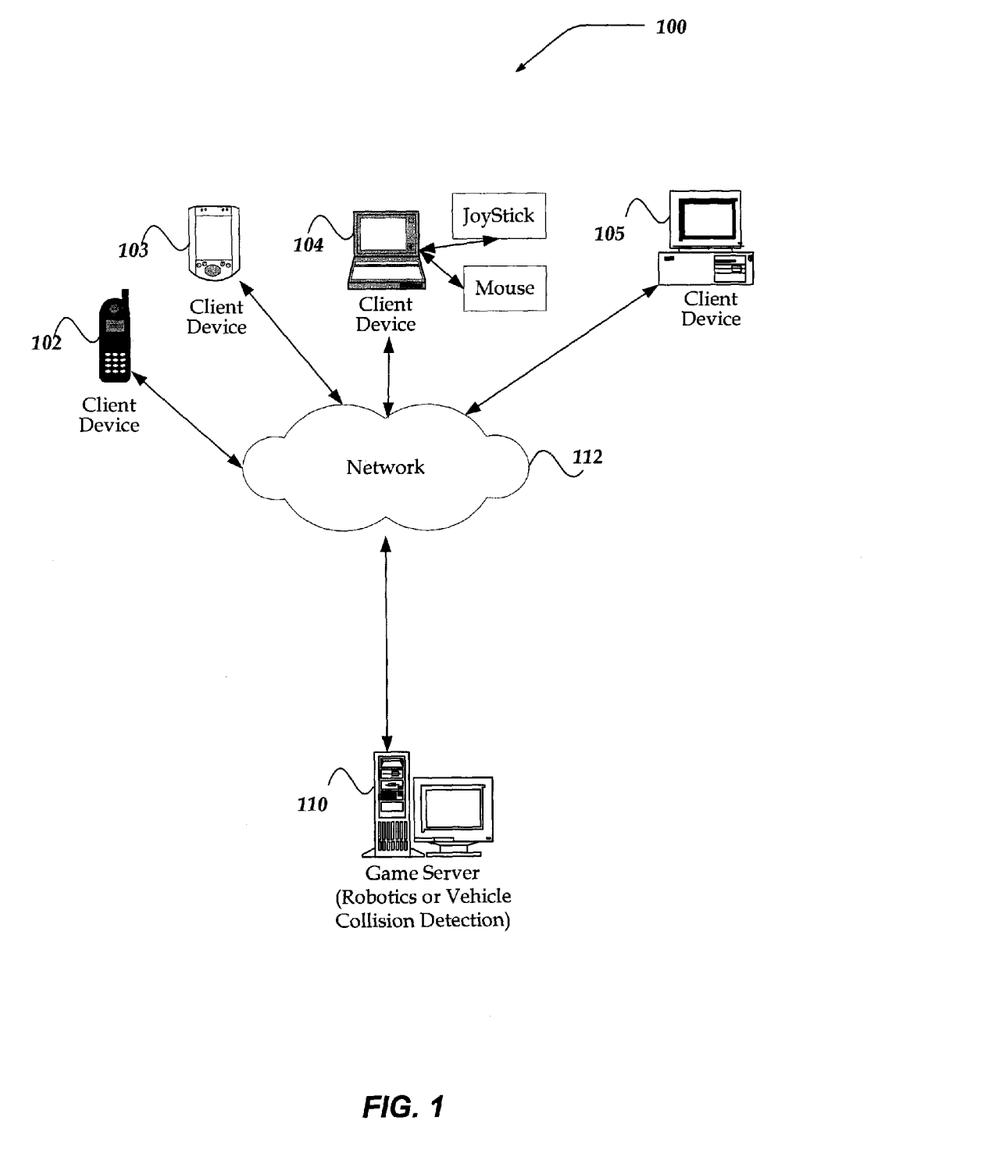
FIG. 1 illustrates one embodiment of an environment in which the invention operates.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client devices 102–105, network 112, and game server 110. Network 112 enables communication between client devices 102–105, and game server 110.

Generally, client devices 102–105 may include virtually any computing device capable of connecting to another computing device to send and receive information, including game information, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device, and the like. Similarly, client devices 102–105 may be any device that is capable of connecting using a wired or wireless communication medium such as a PDA, POCKET PC, wearable computer, and any other device that is equipped to communicate over a wired and/or wireless communication medium.

Client devices 102–105 may further include a client application, and the like, that is configured to manage the actions described above. Moreover, client devices 102–105 may also include a game client application, and the like, that is configured to enable an end-user to interact with and play a game, an interactive program, and the like. The game client may be configured to interact with a game server application, or the like. In one embodiment, the game client is configured to provide various functions, including, but not limited to, authentication, ability to enable an end-user to customize a game feature, synchronization with the game server application, and the like. The game client may further enable game inputs, such as keyboard, mouse, audio, and the like. The game client may also perform some game related computations, including, but not limited to audio, and visuals, rendering, and the like. In one embodiment, client devices 102–105 are configured to receive and store game related files, executables, audio files, graphic files, and the like.

In another embodiment, the game server application resides on another network device, such as game server 110. However, the invention is not so limited. For example, client devices 102–105 may also be configured to include the game server application, and the like, such that the game client and game server applications may interact on the same client device, or even another client device. Furthermore, although the present invention is described employing a client/server architecture, the invention is not so limited. Thus, other computing architectures may be employed, including but not limited to peer-to-peer, and the like.

Network 112 is configured to couple client devices 102–105, and the like, with each other, and to game server 110. Network 112 is enabled to employ any form of computer readable media for communicating information from one electronic device to another. Also, network 112 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 112 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 112 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 112 includes any communication method by which information may travel between client devices 102–105 and game server 110, and the like.

Additionally, network 112 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Game server 110 is described in more detail below in conjunction with FIG. 2. Briefly, however, game server 110 includes virtually any network device configured to include the game server program, and the like. As such, game server 110 may be implemented on a variety of computing devices including personal computers, desktop computers, multiprocessor systems, microprocessor-based devices, network PCs, servers, network appliances, and the like.

Game server 110 may further provide secured communication for interactions and accounting information to speedup periodic update messages between the game client and the game server, and the like. Such update messages may include, but are not limited to a position update, velocity update, audio update, graphics update, authentication information, and the like.

Figure 2:
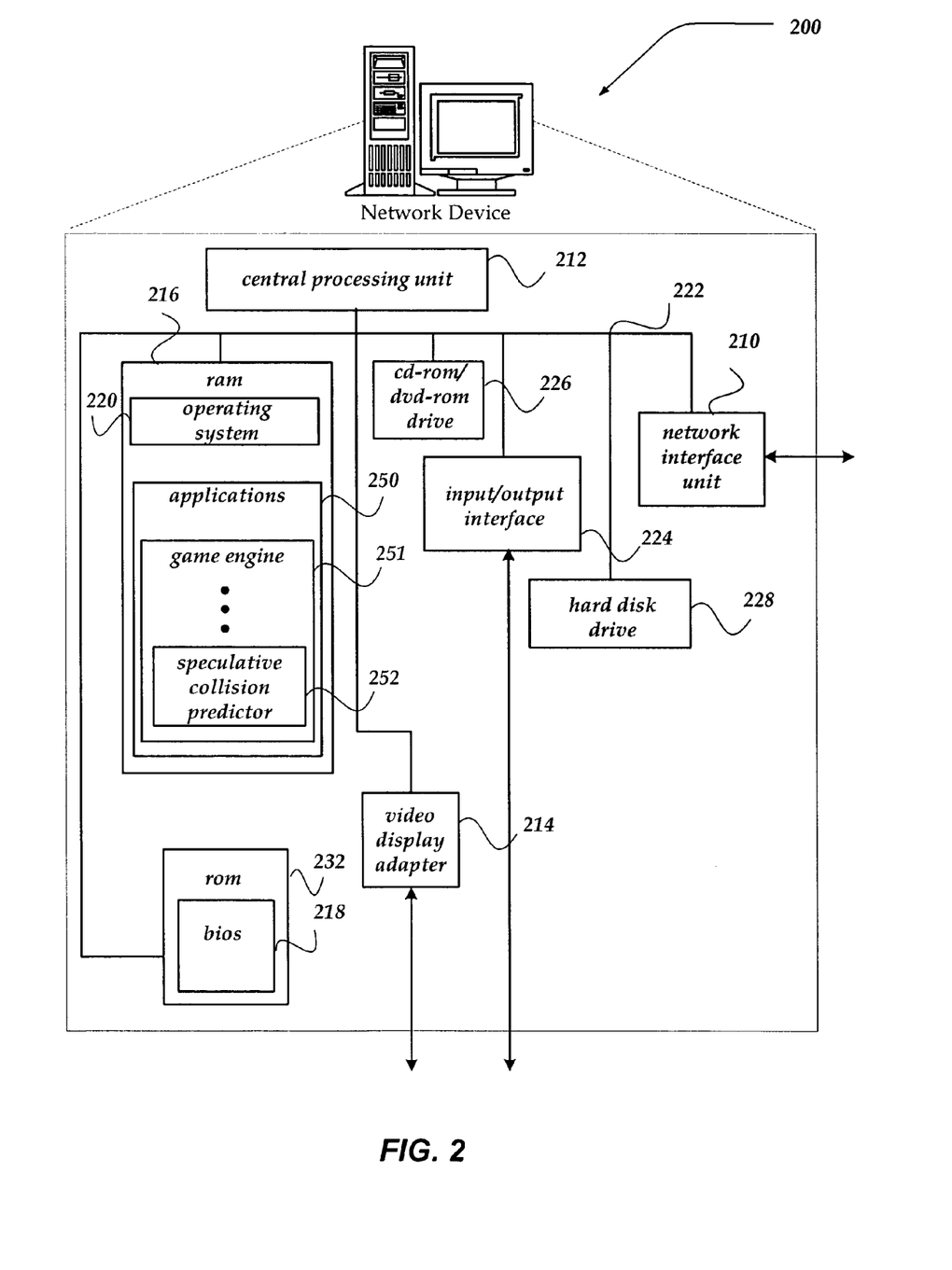
FIG. 2 illustrates a functional block diagram of one embodiment of a network device configured to operate as a game server.

FIG. 2 shows one embodiment of a network device, according to the present invention. Network device 200 may include many more components than those shown. The components shown, however, are sufficient to disclose an illustrative embodiment for practicing the invention. Network device 200 may represent, for example, game server 110 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general purpose operating system may be employed. Basic input/output system ("BIOS") 218 is also provided for controlling the low-level operation of network device 200. As illustrated in FIG. 2, network device 200 also can communicate with the Internet, or some other communications network, such as network 112 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as client devices 102–105 of FIG. 1. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as game engine 251.

Figure 3:
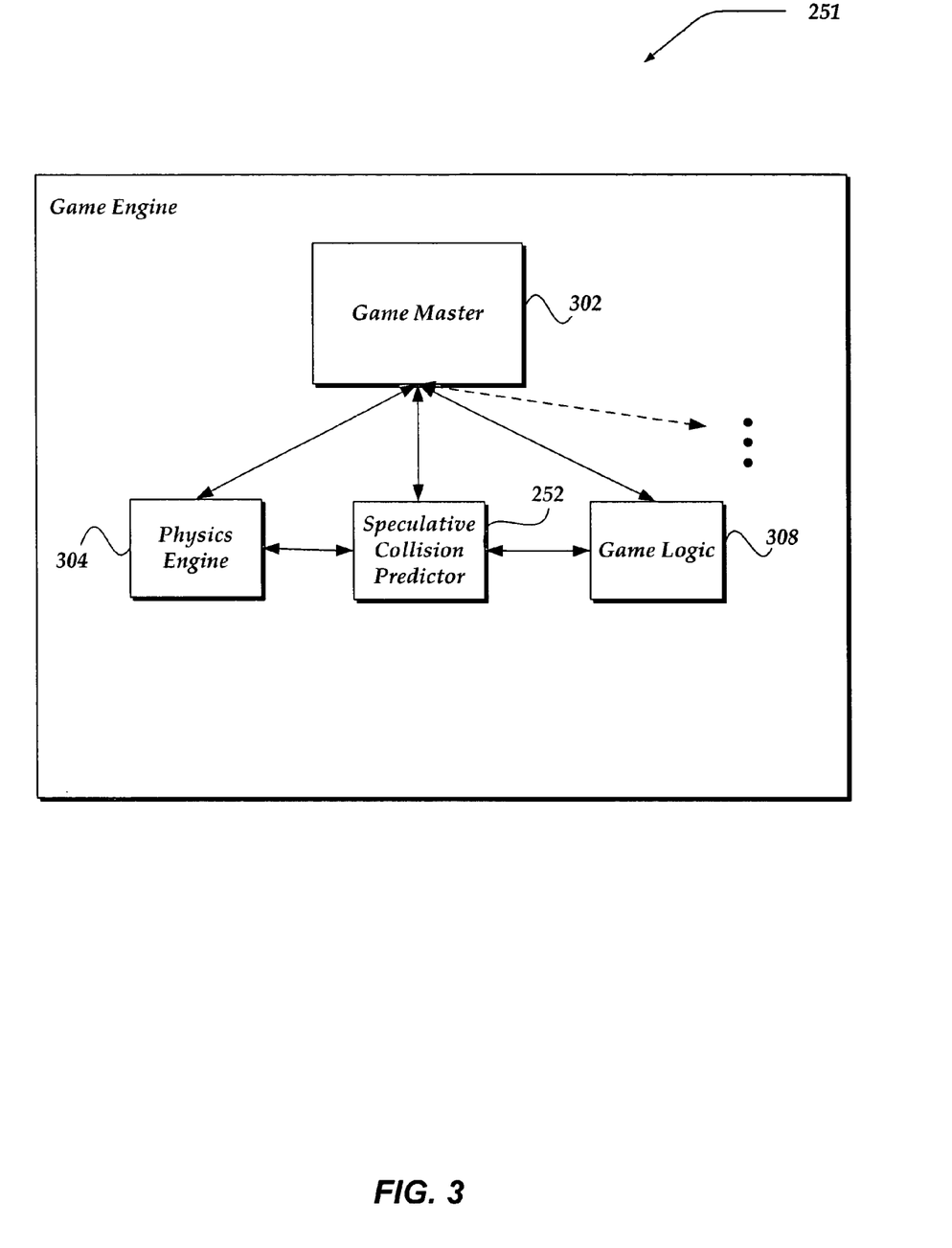
FIG. 3 illustrates a function block diagram of one embodiment of a game engine in which the present invention may operate.

One embodiment of game engine 251 is described in more detail in conjunction with FIG. 3. Briefly, however, game engine 251 is configured to enable an end-user to interact with a game, and similar three-dimensional modeling programs. In one embodiment, game engine 251 interacts with a game client application residing on a client device, such as client devices 102–105 of FIG. 1. Game engine 251 may include at least one module associated with one or more aspects of the game. The modules may include, audio/video module, physics module, animation module, and the like. Speculative collision predictor 252 may be an additional example of a module within game engine 251. Speculative collision predictor 252 may interact with other modules within game engine 251 and perform calculations predicting possible collisions for animated objects. Game engine 251 may employ the predictions, in conjunction with other modules, to create more realistic animation. Game engine 251 may interact with a client application, security application, transport application, and the like, on another device.

Network device 200 may also include an SMTP handler application for transmitting and receiving e-mail, an HTTP handler application for receiving and handling HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

FIG. 3 illustrates a functional block diagram of one embodiment of game engine 251 in which the present invention may operate. Game engine 251 includes game master 302, physics engine 304, speculative collision predictor 252, and game logic 308. Game engine 251 may include other modules such as audio/video module, scenery collection, and the like. In one embodiment game engine 251 may perform a process similar to process 600 as described in FIG. 6.

Game master 302 interacts with physics engine 304, speculative collision predictor 252, game logic 308, and the like, to coordinate various aspects of animation. Game master 302 may also be configured to provide authentication, and communication services with a game client, another game server, and the like. Game master 302 may receive, for example, input events from the game client, such as keys, mouse movements, and the like, and provide the input events to game logic 308, physics engine 304, speculative collision predictor 252, and the like. Game master 302 may further communicate with several game clients to enable multiple players, and the like. Game master 302 may also monitor actions associated with the game client, client device, another game server, and the like, to determine if the action is authorized. Game master 302 may also disable an input from an unauthorized sender.

Individual modules such as physics engine 304, speculative collision predictor 252, and game logic 308 may also interact with each other in addition to their interaction with game master 302.

Physics engine 304 is in communication with game master 302. Physics engine 304 is configured to provide mathematical computations for interactions, movements, forces, torques, and the like. In one embodiment, physics engine 304 is a provided by a third party. However, the invention is not so limited, and virtually any physics engine 304 may be employed that is configured to determine properties of entities, and a relationship between the entities and environments related to the laws of physics as abstracted for a virtual environment.

Game logic 308 is also in communication with game master 302, and is configured to provide game rules, goals, and the like. Game logic 308 may include a definition of a game logic entity within the game, such as an avatar, vehicle, and the like. Game logic 308 may include rules, goals, and the like, associated with how the game logic entity may move, interact, appear, and the like, as well. Game logic 308 may further include information about the environment, and the like, in which the game logic entity may interact.

Speculative Collision Predictor 252 may perform computations necessary to speculate when and where a collision with an object might occur when a player decides to move a character. When a player provides input for a movement of a character, game master 302 may determine a motion plan based, in part, on speculative collision information determined by speculative collision predictor 252. In one embodiment speculative collision predictor 252 may be integrated in physics engine 304. Detailed operation of speculative collision predictor 252 is described below in conjunction with FIGS. 5A–5C and 6.

Figure 4A:
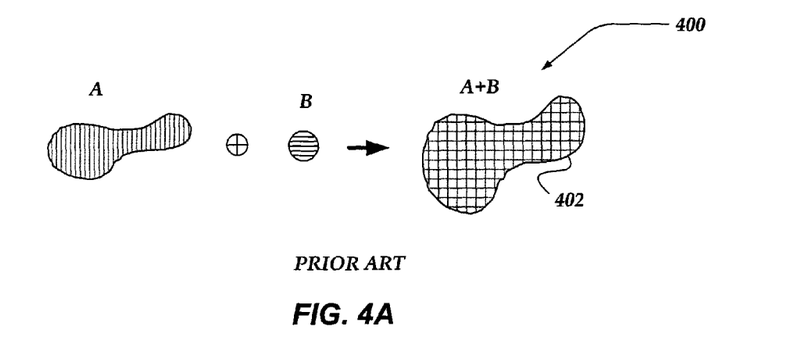
FIGS. 4A–4E illustrate a graphical representation of a Minkowski sum operation and a Gilbert-Johnson-Keerthi (GJK) iterative algorithm.

FIG. 4A illustrates a graphical representation of Minkowski sum operation. As shown in the figure, graphical representation 400 includes object A, object B, and resulting object A+B (402). Object A has an amorphous, convex shape. Object B has a round shape. Resulting object 402 also has an amorphous, convex shape. The objects are shown in two dimensions for ease of representation. However, Minkowski sum operation may be applied to n-dimensional objects including three dimensional objects. The Minkowski sum also applies to objects of any shape. The shapes in FIG. 4A have been chosen randomly.

Objects A and B may be conceptualized as vector sets. Minkowski sum A+B is a vectorial summation of both vector sets resulting in object A+B (402). As mentioned above, the Minkowski sum of two convex objects results in a convex object. A Minkowski sum is, however, unique to each object and changes when one of the objects changes its orientation. Accordingly, if the Minkowski sum operation alone were to be employed to determined interaction between two objects that may move, each time one object moved a new Minkowski sum would have to be computed. The same computation would have to be repeated for any two interacting objects.

Figure 4B:
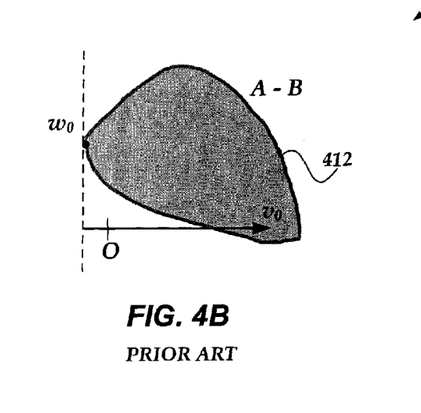

FIGS. 4B–4E illustrate graphical representation 410 of Gilbert-Johnson-Keerthi (GJK) algorithm predicting whether two objects will collide. As indicated before, the GJK algorithm is a vectorial iteration based on modified Minkowski sum operation for approximating v(A−B) for convex objects A and B. In each iteration a simplex is constructed within A−B (412) that is closer to origin O than a simplex constructed in a previous iteration. A set of vertices of the simplex constructed in the k-th iteration (k>1) may be defined by $W_k$, and $v_k$ with $v(conv(W_k))$, a point in the simplex nearest to origin O. The set of vertices $W_k$ may also be represented by a set of vectors $w_k$ from the origin. As shown in FIG. 4B, $W_0=0$, and $v_0$, an arbitrary point in A−B, are initially selected. Since A−B is convex and $W_k \subseteq A-B$, $v_k \in A-B$, and it may be shown $\|v_k\| \geq \|v(A-B)\|$, for all $k \geq 0$.

A sequence of simplices is generated by letting $w_k = s_{A-B}(-v_k)$, where $s_{A-B}$ is a support mapping of A−B (412). Support mappings may be computed differently for different classes of geometric primitives. For purposes of simplification and advantage of faster computing speed, polytopes may be employed as a preferred class. Polytopes include simplices, such as points, rays, triangles, and the like, convex polygons, convex polyhedra, and the like. For a polytope A, the support mapping may be computed employing vertices of the polytope:

$s_A(v) = s_{vert(A)}(v)$, where $s_A(v) \in vert(A)$ and $v \cdot s_A(v) = \max \{v \cdot x : x \in vert(A)\}$.

Next, $v_{k+1}$ and $W_{k+1}$ are determined as $v_{k+1} = v(conv(W_k \cup \{w_k\}))$ and $W_{k+1} = \min \{X : X \subseteq W \cup \{w_k\}$;

$v_{k+1} \in conv(X)\}$.

It can be shown that exactly one X fulfilling the condition above exists and it is affinely independent. Thus, the GJK algorithm disposes of pre-computing the whole Minkowski sum, instead employing vertices of the objects to detect arbitrary collisions. This allows for faster computing and more efficient use of resources such as memory, processor capacity, and the like.

Figure 4C:
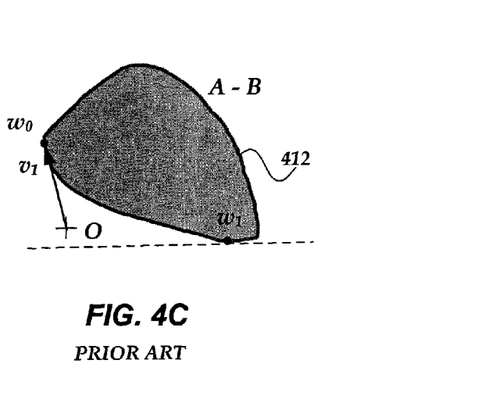
Figure 4D:
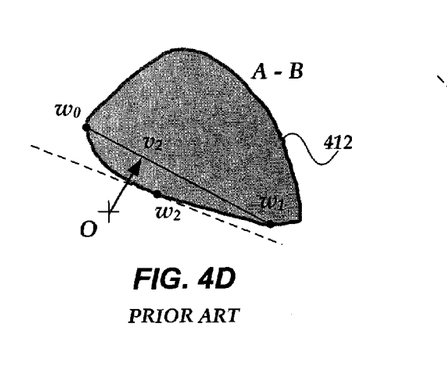

A second iteration, shown in FIG. 4C, determines $w_1$ and $v_1$, where $v_1$ is the vector from origin O to point $w_0$. In FIG. 4D, $w_2$ is determined to satisfy:

$$w_2 = \min\{X : X \subseteq W \cup \{w_1\}; v_2 \in \text{conv}(X)\}.$$

Additionally, a new distance vector $v_2$ is determined to satisfy:

$$v_2 = v(\text{conv}(W_1 \cup \{w_1\})).$$

Figure 4E:
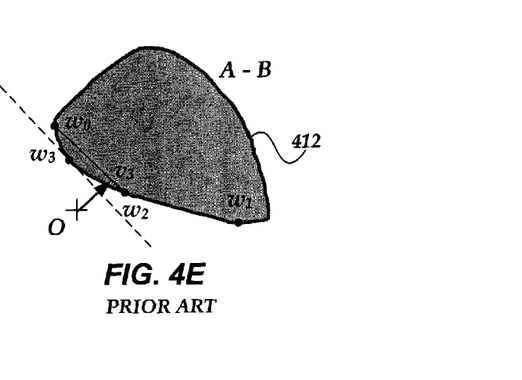

A fourth iteration is shown in FIG. 4E, where $v_3$, and $w_3$ are determined applying the above approach. Graphical representations of $v_k$ illustrate a decrease in $\|v_k\|$ for each iteration. For polytopes, the GJK algorithm arrives at $v_k = v$ (A−B) after a finite number of iterations. For non-polytopes, the number of needed iterations may not be finite. Therefore, a tolerance for $v_k$ may be employed. The algorithm may be terminated as soon as $v_k$ is within the predetermined tolerance.

An embodiment of an algorithm employing the GJK algorithm with a tolerance stop may be as follows:

```
v = "arbitrary point in A–B";
W = 0;
m = 0;
within_tolerance = false;
while not within_tolerance and v ≠ 0 do begin
    w = s_{A−B}(−v);
    d = v · w / ||v||;
    m = max{T, d};
    within_tolerance = ||v|| − m ≦ T;
    if not within_tolerance then begin
        v = v(conv(W ∪ {w}));
        W = "smallest X ⊆ W ∪ {w} such that v ∈ conv(X)";
    end
end;
return ||v||
```

Figure 5A:
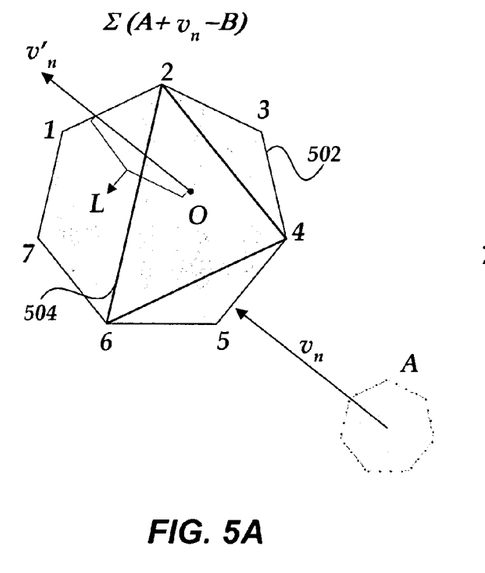
FIGS. 5A–5C illustrate a graphical representation of a process of speculating collisions according to present invention.
Figure 5B:
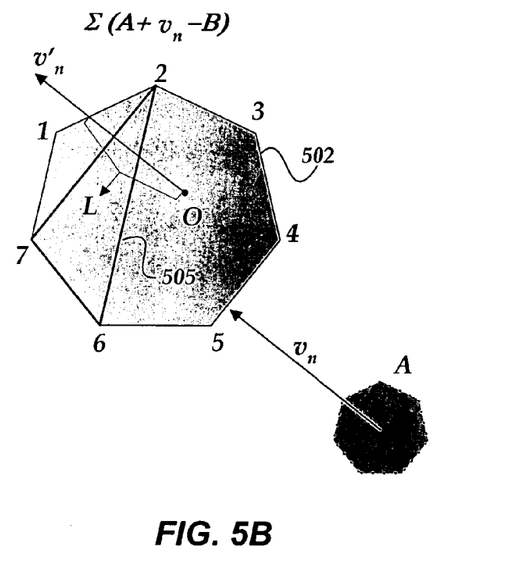
Figure 5C:
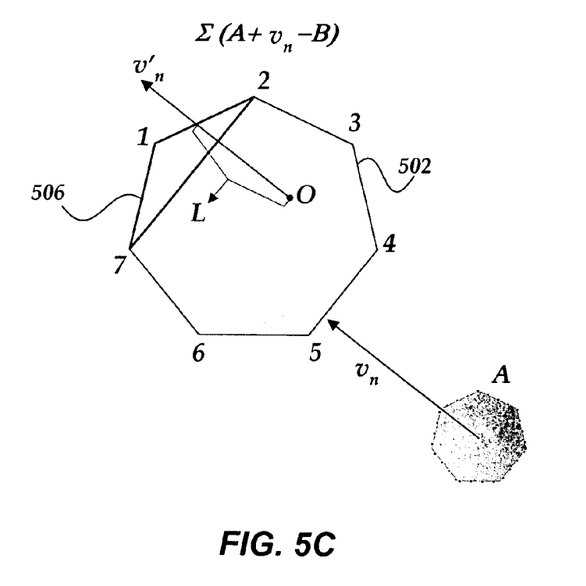

FIGS. 5A–5C illustrate a graphical representation of an iterative process speculating when and where two objects might collide employing an exemplary two dimensional space with polygon shaped objects. As discussed above, the GJK algorithm predicts if a collision might occur by iteratively determining the nearest distance between two objects. However, the GJK algorithm does not predict a time and a location of the collision.

For an object A moving along motion vector $v_n$ and colliding with object B, the relative motion may be expressed as vectorial sum 502 of $A - v_n + B$. The equation defining a space of distances based on the GJK algorithm may be modified to reflect the new sum as:

$$\text{conv}(\text{vert}(A) + \text{vert}(v_n) - \text{vert}(B)).$$

A result of the GJK algorithm for this set may determine whether objects A and B collide when object A is swept through $v_n$. Vectorial sum 502 of A, −B, and $v_n$ may decrease, if the sweep is performed backward along $v_n$. A shifted motion vector $v'_n$ with substantially the same orientation as $v_n$ may be placed in the vectorial sum beginning at the origin O. A length of a line segment L on the shifted motion vector $v'_n$ between the origin O and an intersection point of the shifted motion vector $v'_n$ and an edge of the vectorial sum may determine a time of the speculative collision. The length of line segment L, as shown in FIG. 5A is a distance by which the sweep has been moved back to obtain the time of the collision.

However, without a defined value for virtually all of vectorial sum 502, determining the length of line segment L may be difficult. An alternative may be to extend the GJK algorithm to four dimensions (three dimensions for two dimensional space) and employing a parameter along shifted motion vector $v'_n$ as the fourth dimension, however, from a perspective of computation speed and use of resources such as memory and processor capacity, this alternative may be costly.

To determine the length of line segment L, a potentially more practical and simpler approach may be to employ a simplex, such as a triangle in two dimensional space, and the like. First, a triangle circumscribing the origin O with vertices on the edge of vectorial sum 502 may be constructed. In case of a polygon-shaped vectorial sum 502, the vertices of the triangle would substantially overlap with vertices of vectorial sum 502. Then a number of subsequent triangles along the shifted motion vector $v'_n$ may be constructed with each subsequent triangle having one edge, where the shifted motion vector $v'_n$ intersects, common with a previous triangle. A new vertex of each subsequent triangle may be determined by selecting a farthest vertex of the vectorial sum from the origin O. After an iterative process, there may be no new vertex left on vectorial sum 502 to be selected for a new triangle terminating the process. At that point, a last triangle may be obtained that has one edge substantially the same as vectorial sum 502, where the shifted motion vector $v'_n$ intersects. A set of coordinates for the vertices of the last triangle may define a vector in space that intersects with the shifted motion vector $v'_n$. Then, the computation may become simply determining an intersection of two known vectors yielding a set of coordinates for the intersection point. Utilizing these coordinates a length of the line segment L on the shifted motion vector $v'_n$ may be determined. Because the shifted motion vector $v'_n$ already includes speed and direction information, a time of the collision may be determined employing the length of the line segment L without having to compute a surface of vectorial sum 502.

In the above process, if a set of coordinates for the intersection point are determined to be substantially the same as a set of coordinates for the first vertex of line segment L, one may deduct that object A and object B started out intersecting each other.

The process above may also be employed to determine a substantially exact location of the collision on object A and object B. As described above, each vertex of vectorial sum 502 is a result of vectorial summation of a vertex of object A minus a vertex of object B plus a vertex of line segment L. For each triangle that is constructed as part of the process, information about coordinates of objects A and B, and line segment L that yield the coordinates of the vertices for the triangle may be stored. As a result, when the last triangle is constructed, corresponding coordinates of the vertices of both objects may be determined from the coordinates of the last triangle. The corresponding coordinates of objects A and B represent coordinates of vertices at intersection point determining the location of collision.

An exemplary implementation of such a process, employing triangles to determine the time of the collision, is shown in FIGS. 5A–5C. Once a collision is predicted, the shifted motion vector $v'_n$ is placed at the origin and in substantially the same orientation as motion vector $v_n$. Then, first triangle 504 may be constructed around the origin O. Three vertices of first triangle 504 are substantially the same as three vertices of the polygon-shaped vectorial sum 502. FIG. 5A illustrates first triangle 504 with vertices 2, 4, and 6. The shifted motion vector $v'_n$ intersects a farthest edge from the origin of first triangle 504. As shown in FIG. 5B, the second step includes constructing second triangle 505 that shares an edge between vertices 2 and 6. A new vertex for second triangle 505 may be determined by selecting a farthest vertex of vectorial sum 502 from the origin, such that first triangle 504 and second triangle 505 do not overlap. As the figure illustrates, the shifted motion vector $v'_n$ still intersects a farthest edge from the origin of second triangle 505, and the farthest edge of second triangle 505 is smaller than the farthest edge of first triangle 504. FIG. 5C illustrates the last step in the process, where third triangle 506 is constructed that shares an edge between vertices 7 and 2 with second triangle 505. A new vertex of third triangle 506 is the only remaining vertex of vectorial sum 502 to be selected without the triangles overlapping in this example. Therefore, the iterative process ends at step three. Third triangle 506 shares an edge between vertices 1 and 2 with vectorial sum 502 that is intersected by the shifted motion vector $v'_n$.

Determination of a support mapping of each triangle provides a set of coordinates for the vertices. As mentioned above the length of line segment L on the shifted motion vector $v'_n$ between the origin and the farthest edge of vectorial sum 502 determines the time of the collision. Instead of performing a time consuming and resource requiring computation of the length of line segment L employing other methods, the length may be determined by calculating distance between vertices of each triangle in the construction. In one embodiment, a game engine performing the computation may need to store only the coordinates of the vertices of the constructed triangles.

Furthermore, a set of coordinates for the intersection point may be determined with the help of the coordinates of the vertices of the last triangle, providing the location of the collision on objects A and B. While the iterative process has been described employing an exemplary two dimensional space and polygon-shaped objects, the process may be implemented in one, three, or multi dimensional spaces and for objects with other shapes. An implementation employing polygon or polytope shaped objects enables the computation to reach a result after constructing a finite number of simplices. If other shapes such as a circle, a globe, and the like are employed, a tolerance for terminating the iterative process may be determined. The construction of simplices may be terminated, when a farthest edge of a last simplex is smaller than the predetermined tolerance.

Figure 6:
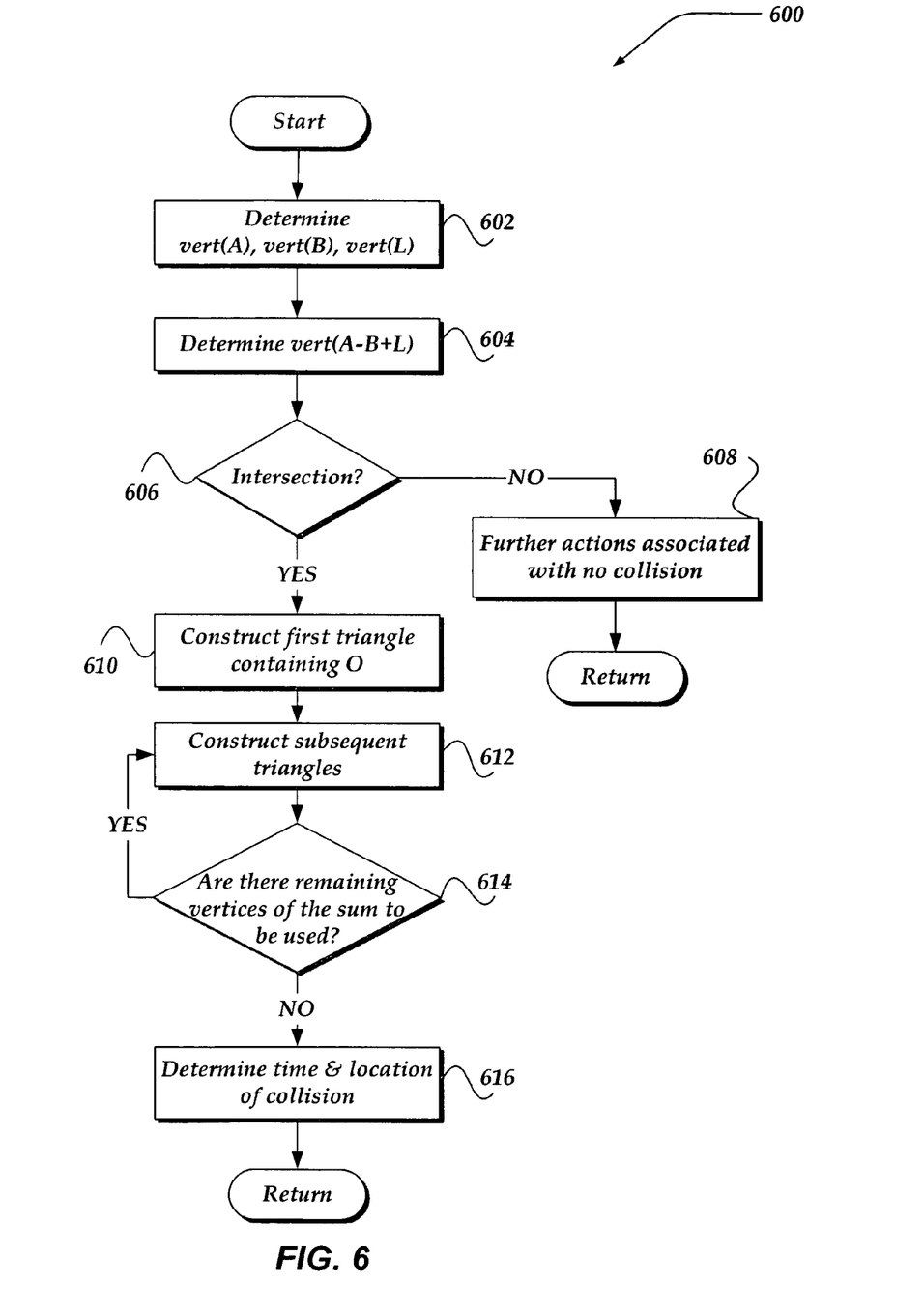
FIG. 6 illustrates a flow diagram generally showing one embodiment of a process of speculating collisions.

The operation of certain aspects of the present invention will now be described with respect to FIG. 6. FIG. 6 illustrates a flow diagram generally showing one embodiment of a process of speculative collisions. Process 600 of FIG. 6 may be implemented, for example, within game server 110 of FIG. 1.

A motion plan may be determined based on a variety of factors, including, but not limited to, an input from a client device, a game rule, a reaction to another entity, and the like. The motion plan may include speculative collision information for the character and any objects surrounding the character.

Process 600 begins, after a start block, at block 602, where vertices of objects A and B, as well as motion vector $v_n$ are determined. In one embodiment, object A may be a character, a movable object, and the like in a video game. Object B may be another object which may or may not be on a path of motion by object A. Motion vector $v_n$ defines the path of motion along which object A may move.

Processing proceeds next to block 604, where a modified Minkowski sum of object A minus object B and motion vector $v_n$ is computed to determine if there is an intersection indicating a collision between the two objects.

Block 604 is followed by decision block 606, where the determination is made whether there is a collision. If the decision is negative, processing proceeds to block 608, where the program determines further actions in the absence of a collision, and then returns to a calling process to perform other actions. If the decision is affirmative, processing proceeds to block 610.

At block 610 a first triangle is constructed employing three vertices of the modified Minkowski sum that contains an origin and a shifted motion vector $v'_n$ that begins at the origin and has substantially the same orientation as the motion vector $v_n$. A set of coordinates for the vertices of the first triangle may also be stored for future computation at this step. Processing then proceeds to block 612.

Block 612 along with decision block 614 includes an iterative sub-process, where subsequent triangles are constructed along the shifted motion vector $v'_n$ that share an edge with a previous triangle, and where a new vertex for each subsequent triangle is determined by selecting a vertex of the modified Minkowski sum farthest from the origin. A farthest edge of each triangle is intersected by the shifted motion vector $v'_n$. At decision block 614 a determination is made whether a collision plane is reached. The collision plane is reached when no more vertex of the modified Minkowski sum remains to be selected for a new triangle. If the decision is affirmative, processing returns to block 612 to add another triangle. If the decision is negative, construction of subsequent triangles is considered completed, and processing proceeds to block 616. At each step along the iterative sub-process, vertices of each triangle may be stored for later computation of a time and a location of the speculative collision.

At block 616, the time of the collision is determined based on the length of a line segment L on the shifted motion vector $v'_n$ that is between the origin and the intersection point of the shifted motion vector $v'_n$ and a farthest edge of a last triangle. The length may be determined through a computation employing the coordinates of the vertices of the constructed triangles. The location of the collision is also determined by employing the coordinates of the intersection point of the shifted motion vector $v'_n$ and the farthest edge of the last triangle constructed at block 612, since that edge represents the closest point to the collision plane. For example, in FIG. 5C, the edge between vertices 1 and 2 represents the collision plane between objects A and B.

Upon completion of block 616, processing returns to a calling process to perform other actions.

It is noted that while process 600, above, illustrates speculating collisions for animated objects in a video game, and the like, the invention is not so limited. For example, results associated with determining speculative collision may be implemented in robotics, vehicle collision detection, and the like, without departing from the scope of the invention.

Additionally, although the present invention is described in the context of a game, the invention is not so limited. For example, the present invention may be applicable to virtually any three-dimensional program that includes at least one object that may intersect with another object.

It will be understood that each block of the flowchart illustration, and combinations of blocks in the flowchart illustration of FIG. 6, may be implemented by a combination of hardware-based systems and software instructions. The software instructions may be executed by a processor to cause a series of operational steps to be performed by the processor to produce a computer implemented process such that the instructions, which execute on the processor, provide steps for implementing some or all of the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The various embodiments have been described above in light of certain mathematical relationships. A person skilled in the art would note that these mathematical relationships are subject to many possible computer implementations, which are all within the scope of the invention. For, example, Minkowski sum operation is merely one of multiple ways of determining a spatial summation of two objects. Similar convolution techniques, and the like, may be employed to accomplish a substantially similar result. Furthermore, it should be noted that the language of mathematics allows many ways to convey the same relationship. All such variations of the above described equations and relationships are naturally within the scope of the invention.

The above specification, examples, and data provide illustrative embodiments of the present invention. Since many embodiments of the invention can be made without departing from the spirit and scope of the invention, the invention resides in the claims hereinafter appended.

I claim:

1. A method of speculating a collision, comprising:
    determining vertices of a first object, a second object, and a motion vector indicative of a motion of the first object, wherein the first and second objects are polyhedra;
    detecting a collision by determining if an origin, comprising an intersection of the motion vector and the second object, is within a vectorial sum that comprises a vector set of vertices of the first object, the second object and the motion vector;
    if a collision is detected:
        determining a shifted motion vector beginning at about the origin and having substantially the same orientation as the motion vector;
        determining at least one tetrahedron comprising four vertices of the vectorial sum, wherein the origin is within the tetrahedron;
        if a side of the tetrahedron overlaps with a side of the vectorial sum, wherein the shifted motion vector intersects the side, determining a length of a line segment between the origin and an intersection point of the shifted motion vector and the side based on a set of coordinates of the vertices of the side and the shifted motion vector;
        determining a time of the collision based, in part, on the length of the line segment and shifted motion vector; and
    displaying an image of the first object based on the detected collison and, in part, the shifted motion vector.

2. The method of claim 1, further comprising:
    constructing a subsequent tetrahedron that comprises a side of a previous tetrahedron that intersects with the shifted motion vector, and a new vertex, wherein the new vertex is substantially the same as a vertex of the vectorial sum, and wherein the subsequent tetrahedron and a previous tetrahedron do not overlap;
    if no new vertex of the vectorial sum remains to be selected, terminating the construction of the tetrahedrons.

3. The method of claim 2, further comprising:
    storing coordinates of vertices of the first object, the second object, and the line segment for each vertex of a constructed tetrahedron;
    determining a location of the collision based, in part, on the coordinates of the vertices of a last tetrahedron, wherein coordinates of vertices of the first object and the second object corresponding to the coordinates of the vertices of the last tetrahedron provide locations of collision on each object.

4. The method of claim 1, further comprising:
    the first object and the second object that include non-polyhedra;
    constructing each subsequent tetrahedron by selecting an intersection point of a normal to the shifted motion vector and the side of the vectorial sum;
    predetermining a tolerance for a size of the farthest side of the last tetrahedron; and
    if the farthest side of the last tetrahedron is less than about the tolerance, terminating the construction.

5. The method of claim 1, wherein the first object is at least one of a character, an object movable by the character, and an independently movable object, and wherein the second object is at least one of a stationary object and a movable object.

6. The method of claim 1, wherein the method is implemented in at least one of a video game, a vehicle detection collision system, and a robotics control system.

7. The method of claim 1, wherein the method is adapted to operate within at least one of a client/server architecture, and a peer-to-peer architecture.

8. The method of claim 1, wherein the motion further comprises a movement based on at least one of a keyboard input, a mouse input, an audio input, a joystick input, a reaction to another game logic entity, and a game rule.

9. A method of speculating a collision, comprising:
    determining vertices of a first object, a second object, and a motion vector indicative of a motion of the first object, wherein the first and second objects are polygons;
    detecting a collision by determining if an origin, comprising an intersection of the motion vector and the second object, is within a vectorial sum that comprises a vector set of vertices of of the first object, the second object and the motion vector;
    if a collision is detected:
    determining a shifted motion vector beginning at about the origin and having substantially the same orientation as the motion vector;
    determining at least one triangle comprising three vertices of the vectorial sum, wherein the origin is within the triangle;
    if an edge of the triangle overlaps with an edge of the vectorial sum, wherein the shifted motion vector intersects the edge, determining a length of a line segment between the origin and an intersection point of the shifted motion vector and the edge based on a set of coordinates of the vertices of the edge and the shifted motion vector;
    determining a time of the collision based, in part, on the length of the line segment and shifted motion vector; and
    displaying an image of the first object based on the detected collison and, in part, the shifted motion vector.

10. The method of claim 9, further comprising:
while a new vertex of the vectorial sum remains to be selected, iteratively:
constructing a subsequent triangle that comprises an edge of a previous triangle that intersects with the shifted motion vector, and a new vertex, wherein the new vertex is substantially the same as a vertex of the vectorial sum, and wherein the subsequent triangle and a previous triangle do not overlap.

11. The method of claim 10, further comprising:
storing coordinates of vertices of the first object, the second object, and the line segment for each vertex of a constructed triangle;
determining a location of the collision based, in part, on the coordinates of the vertices of a last triangle, wherein coordinates of vertices of the first object and the second object corresponding to the coordinates of the vertices of the last triangle provide locations of collision on each object.

12. The method of claim 9, further comprising:
the first object and the second object that include non-polygons;
constructing each subsequent triangle by selecting an intersection point of a normal to the shifted motion vector and the edge of the vectorial sum;
predetermining a tolerance for a length of the farthest edge of the last triangle; and
if the farthest edge of the last triangle is less than about the tolerance, terminating the construction.

13. A video game platform, comprising:
a transceiver for receiving an input from a player and sending audio/visual feedback to the player; and
a game engine that is configured to perform actions, including:
determining vertices of a first object, a second object, and a motion vector indicative of a motion of the first object, wherein the first and second objects are polygons;
detecting a collision by determining if an origin, comprising an intersection of the motion vector and the second object, is within a vectorial sum that comprises a vector set of vertices of the first object, the second object and the motion vector;
if a collision is detected:
determining a shifted motion vector beginning at about the origin and having substantially the same orientation as the motion vector;
determining at least one triangle comprising three vertices of the vectorial sum, wherein the origin is within the triangle;
if an edge of the triangle overlaps with an edge of the vectorial sum, wherein the shifted motion vector intersects the edge, determining a length of a line segment between the origin and an intersection point of the shifted motion vector and the edge based on a set of coordinates of the vertices of the edge and the shifted motion vector;
determining a time of the collision based, in part, on the length of the line segment and shifted motion vector; and
displaying an image of the first object based on the detected collision and, in part, the shifted motion vector.

14. The video game platform of claim 13, wherein the game engine is further configured to perform actions including:
constructing a subsequent triangle that comprises an edge of a previous triangle that intersects with the shifted motion vector, and a new vertex, wherein the new vertex is substantially the same as a vertex of the vectorial sum, and wherein the subsequent triangle and a previous triangle do not overlap;
if no new vertex of the vectorial sum remains to be selected, terminating the construction of triangles.

15. The video game platform of claim 13, wherein the platform is further configured to act as a server, and receive and send information associated with the video game to a client device.

16. The video game platform of claim 13, wherein the motion further comprises a movement based on at least one of a keyboard input, a mouse input, an audio input, a joystick input, a reaction to another game logic entity, and a game rule.

17. A system for managing a video game over a network, comprising:
a client that is configured to perform actions, comprising:
sending a motion indication; and
a server that is configured to perform actions, comprising:
receiving the motion indication;
determining vertices of a first object, a second object, and a motion vector indicative of a motion of the first object, wherein the first and second objects are polygons;
detecting a collision by determining if an origin, comprising an intersection of the motion vector and the second object, is within a vectorial sum that comprises a vector set of vertices of the first object, the second object and the motion vector;
if a collision is detected:
determining a shifted motion vector beginning at about the origin and having substantially the same orientation as the motion vector;
determining at least one triangle comprising three vertices of the vectorial sum, wherein the origin is within the triangle;
if an edge of the triangle overlaps with an edge of the vectorial sum, wherein the shifted motion vector intersects the edge, determining a length of a line segment between the origin and an intersection point of the shifted motion vector and the edge based on a set of coordinates of the vertices of the edge and the shifted motion vector;
determining a time of the collision based, in part, on the length of the line segment and shifted motion vector; and
displaying an image of the first object based on the detected collision and, in part, the shifted motion vector.

18. The system of claim 17, wherein the server is further configured to perform further actions, comprising:
constructing a subsequent triangle that comprises an edge of a previous triangle that intersects with the shifted motion vector, and a new vertex, wherein the new vertex is substantially the same as a vertex of the vectorial sum, and wherein the subsequent triangle and a previous triangle do not overlap;
if no new vertex of the vectorial sum remains to be selected, terminating the construction of triangles.

19. The system of claim 18, wherein the server is further configured to perform further actions, comprising:
  storing coordinates of vertices of the first object, the second object, and the line segment for each vertex of a constructed triangle;
  determining a location of the collision based, in part, on the coordinates of the vertices of a last triangle, wherein coordinates of vertices of the first object and the second object corresponding to the coordinates of the vertices of the last triangle provide locations of collision on each object.

20. The system of claim 17, wherein the first object is at least one of a character, an object movable by the character, and an independently movable object, and wherein the second object is at least one of a stationary object and a movable object.

21. The system of claim 17, wherein a speculative collision module within a game engine is utilized to speculate the collision.

22. The system of claim 21, wherein the game engine resides in the server.

23. A computer-reader medium having computer-executable instructions for speculating collisions in a video game, the computer-executable instructions enable a computing device to perform actions comprising:
  transferring a motion indication;
  enabling a determination of vertices of a first object, a second object, and a motion vector indicative of a motion of the first object, wherein the first and second objects are polygons;
  enabling a detection of a collision by determining if an origin, comprising an intersection of the motion vector and the second object, is within a vectorial sum that comprises a vector set of vertices of the first object, the second object and the motion vector;
  if a collision is detected:
    enabling a determination of a shifted motion vector beginning at about the origin and having substantially the same orientation as the motion vector;
    enabling a determination of at least one triangle comprising three vertices of the vectorial sum, wherein the origin is within the triangle;
    if an edge of the triangle overlaps with an edge of the vectorial sum, wherein the shifted motion vector intersects the edge, enabling a determination of a length of a line segment between the origin and an intersection point of the shifted motion vector and the edge based on a set of coordinates of the vertices of the edge and the shifted motion vector; and
    enabling a determination of a time of the collision based, in part, on the length of the line segment and shifted motion vector.

24. The computer-readable medium of claim 23 including instruction, further comprising:
  while a new vertex of the vectorial sum remains to be selected, iteratively enabling a construction of a subsequent triangle that comprises an edge of a previous triangle that intersects with the shifted motion vector, and a new vertex, wherein the new vertex is substantially the same as a vertex of the vectorial sum, and wherein the subsequent triangle and a previous triangle do not overlap.

25. An apparatus for managing a game system, comprising:
  a means for receiving the motion indication;
  a means for determining vertices of a first object, a second object, and a motion vector indicative of a motion of the first object, wherein the first and second objects are polygons;
  a means for detecting a collision by determining if an origin, comprising an intersection of the motion vector and the second object, is within a vectorial sum that comprises a vector set of vertices of the first object, the second object and the motion vector;
  if a collision is detected:
    a means for determining a shifted motion vector beginning at about the origin and having substantially the same orientation as the motion vector;
    a means for determining at least one triangle comprising three vertices of the vectorial sum, wherein the origin is within the triangle;
    if an edge of the triangle overlaps with an edge of the vectorial sum, wherein the shifted motion vector intersects the edge, a means for determining a length of a line segment between the origin and an intersection point of the shifted motion vector and the edge based on a set of coordinates of the vertices of the edge and the shifted motion vector; and
    a means for determining a time of the collision based, in part, on the length of the line segment and shifted motion vector.

* * * * *

UNITED STATES PATENT AND TRADEMARK OFFICE
CERTIFICATE OF CORRECTION

| | | |
|---|---|---|
| PATENT NO. | : 7,129,951 B2 | Page 1 of 1 |
| APPLICATION NO. | : 10/840755 | |
| DATED | : October 31, 2006 | |
| INVENTOR(S) | : John B. Stelly III | |

It is certified that error appears in the above-identified patent and that said Letters Patent is hereby corrected as shown below:

First Page Col. 1 (U.S. Patent Documents); Line 1; After "4,785,399" delete "A" and insert -- B1 --, therefor.

First Page Col. 1 (U.S. Patent Documents); Line 2; After "5,047,916" delete "A" and insert -- B1 --, therefor.

First Page Col. 1 (U.S. Patent Documents); Line 3; After "5,835,684" delete "A" and insert -- B1 --, therefor.

First Page Col. 1 (U.S. Patent Documents); Line 4; After "5,889,926" delete "A" and insert -- B1 --, therefor.

Column 5; Line 16; Delete "Mobil" and insert -- Mobile --, therefor.

Column 13; Line 60; In Claim 1, delete "collison" and insert-- collision --, therefor.

Column 14; Line 47; In Claim 9, after "vertices of" delete "of". (Second Occurrence)

Column 14; Line 67; In Claim 9, delete "collison" and insert -- collision --, therefor.

Column 17; Line 22; In Claim 23, delete "computer-reader" and insert -- computer-readable --, therefor.

Signed and Sealed this

Tenth Day of April, 2007

JON W. DUDAS
*Director of the United States Patent and Trademark Office*